United States Patent [19]
Pacey et al.

[11] 3,744,322
[45] July 10, 1973

[54] ANGULAR VELOCITY SENSORS

[75] Inventors: Gordon C. Pacey, Mansonville, Quebec, Canada; Sumner H. Wolfson, Northfield, Vt.

[73] Assignee: Space Research Corporation, North Troy, Vt.

[22] Filed: Dec. 7, 1970

[21] Appl. No.: 95,865

[52] U.S. Cl. .................................. 73/505
[51] Int. Cl. .............................. G01c 19/56
[58] Field of Search ........................ 73/505

[56] References Cited
UNITED STATES PATENTS

| | | | |
|---|---|---|---|
| 2,627,400 | 2/1953 | Lyman et al. | 73/505 |
| 3,201,998 | 8/1965 | Horn | 73/505 |
| 3,258,617 | 6/1966 | Hart | 73/505 UX |
| 3,141,100 | 7/1964 | Hart | 73/505 X |
| 2,479,122 | 8/1949 | Konet | 73/505 X |
| 3,520,195 | 7/1970 | Tehon | 73/505 |
| 2,683,247 | 7/1954 | Wiley | 73/505 |

*Primary Examiner*—James J. Gill
*Attorney*—Stevens, Davis, Miller & Mosher

[57] ABSTRACT

An angular rate sensor is disclosed which includes a plurality of proof masses driven so that each has a cyclically repetitive movement and so that the motions of the proof masses balance one another to provide inertial balance, and sensor means arranged to provide an output indicative of Coriolis forces on the said masses when the sensor is subjected to angular velocity about at least one predetermined axis. The device can also be used to measure translational accelerations and rotational accelerations along two axes.

15 Claims, 11 Drawing Figures

ANGULAR VELOCITY SENSORS

This invention relates to angular velocity sensors, one use of which is in navigation systems, although it can find application wherever necessary to sense or to measure angular velocity of a body.

The invention makes use of the Coriolis phenomenon, and its object is the provision of an improved angular velocity sensor which makes use of that phenomenon, as well as other forces. The invention can be applied to provide single sensors which respond to two angular component velocities respectively at right angles to one another.

According to the present invention, an angular rate sensor includes a plurality of proof masses driven so that each has cyclically repetitive movement and so that the motions of these proof-masses have a direction, phase and amplitude so arranged as to allow separation of the various effects of their motion, and yet be in dynamic balance, so as to reduce housing vibration and sensor error induced by the input drive.

Thus, by use of the invention, it is possible to ascertain angular velocity, angular acceleration and linear acceleration relative to selected axes, collectively and selectively at the will of the designer.

The invention will now be described, by way of example, with reference to the accompanying drawings, in which.

Figure 1:
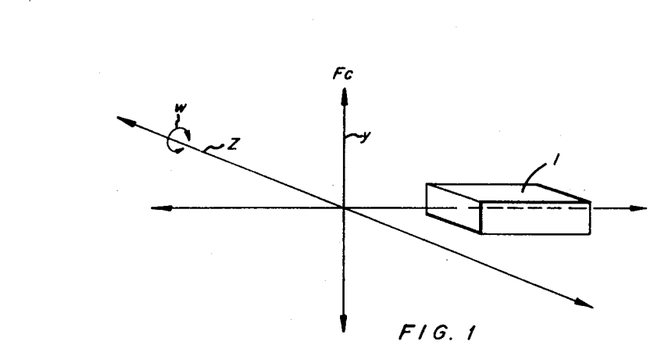
FIG. 1 is an explanatory diagram indicating the use of the Coriolis phenomenon in an angular velocity sensor.

Considering first FIG. 1, in this Figure is shown in a rigid body 1 which is in rotation about an axis $z$ with an angular velocity $\omega$. If the body is now moved to the right in the direction of axis $x$, which is perpendicular to axis $z$, then the body will tend to experience a force along the axis $y$, which is perpendicular to both axes $z$ and $x$, if the frame of reference is assumed to rotate with the body. The force $F_c$ produced along the axis $y$ has a magnitude and direction dependent upon, among other things:

the sense and the magnitude of the angular velocity $\omega$;

the sense and the magnitude of the velocity V along the X axis;

the mass of body 1;

If a body subject to a steady angular velocity $\omega$ is given a sinusoidal translational velocity about a mean position, the force $F_c$ will also vary sinusoidally. It follows that, from a measurement of the force $F_c$, information as to the magnitude and sense of the angular velocity $\omega$ can be obtained. This operating principle is that used in some present angular velocity sensors, and no claim is made as to the novelty of that operating principle.

Figure 2:
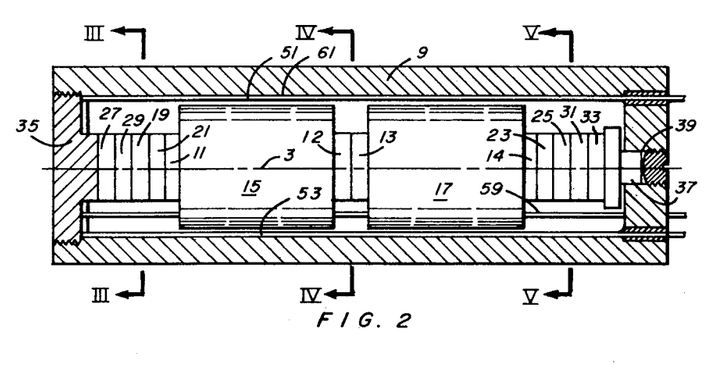
FIG. 2 is a sectional side elevation of a pitch and yaw angular velocity sensor.
Figure 3:
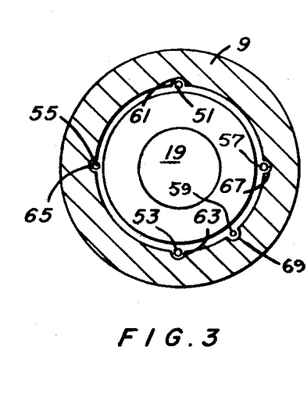
FIGS. 3, 4 and 5 are transverse cross secitons taken on the lines III—III, IV—IV, and V—V respectively of FIG. 2, looking in the directions indicated by the arrows.
Figure 4:
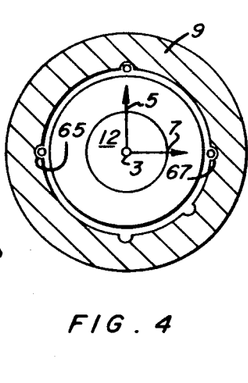
Figure 5:
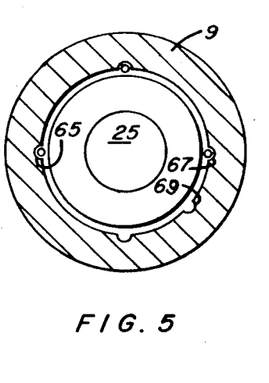

Referring now to FIGS. 2 through 5, these figures illustrate diagrammatically an angular velocity sensor which is sensitive to angular velocities in two mutually perpendicular directions. Thus in FIG. 2 is indicated the longitudinal axis 3 of the sensor, and in FIG. 4 are indicated the said two mutually perpendicular directions or axis 5 and 7. The sensor includes a cylindrical housing 9 which contains an assembly consisting of piezoelectric compression elements 11, 12, 13 and 14, mounted in pairs on opposite sides of two proof masses 15 and 17, first and second pairs of shear sensors 19,21,23 and 25 sensitive to shear forces in the direction 5 and third and fourth pairs of shear sensors 27, 29,31 and 33 sensitive to shear forces in the direction 7.

In utilizing any device of this nature great care must be taken to ensure that the element sensing the Coriolis force should be insensitive to the direct effects of the motion of the proof masses. In particular, it is important that the component of the driving force in the direction of sensitivity of the sensing element is negligible since otherwise this would register as a spurious Coriolis force. It is emphasized that careful alignment is important to the best functioning of the device. For this reason, the preparation of the driver elements should be carefully controlled, and a means to adjust the axis of drive of each element must be provided if needed. Means to control the amplitude and phase of each unit is also required for best operation of the device. In addition, the design of the instrument must be such as to confine the motion to precisely defined paths (in this case linear) in order to minimize pickup of the drive input by the sensors. In this realization, pure rectilinear vibration is desired with complete repression of all more complicated motions. For this reason, the importance of dynamic balancing of the vibrating elements and isolation from the housing becomes readily apparent.

In vector notation, the equations of motion of a body in a frame of reference rotating with angular velocity $\dot{\theta}$ and with a radius of gyration $r^+$ is given by $$\vec{F} = \{m\vec{r}^+ + 2\dot{\theta}(\vec{k} \times \vec{r}^+) + \dot{\theta}^2[\vec{k} \times (\vec{k} \times \vec{r}^+)]\}$$

where $k$ is a unit vector in the direction of the axis of rotation.

The first term in the brackets represents the linear accelerations, the second represents Coriolis force while the third represents centrifugal force. In general motion, all three effects will appear on each sensor, so that an ambiguous reading will result unless steps are taken to remove the ambiguity. In the invention disclosed here, the multiplicity of proof masses and sensing elements can be sufficient to allow this ambiguity to be removed. In particular, by careful alignment of the drive axis perpendicular to the sensing axis, it is possible to isolate Coriolis forces unambiguously, by separating out the components having the proper frequency and phase relationship. This comes about because the proof masses are driven at a precisely known frequency and in a precisely known direction. The use of more than one proof-mass allows a sufficiency of independent readings to be obtained so that one may determine the individual effects of the three types of forces in a particularly convenient manner.

In any given plane perpendicular to the axis of vibration linear and angular accelerations will show up as forces along the direction of acceleration. If it is assumed that the axis of rotation passes through the center of symmetry of the device, then linear accelerations will produce reaction forces in the same direction on the two masses, while angular acceleration will produce forces in opposite directions. Thus, by taking appropriate sums and differences of the non-oscillating components of the various forces as determined by the appropriate sensing elements, it is possible to determine these two quantities for the two axes of sensitivity in question. Since it is always appropriate to analyze any motion of a point as the sum of a linear motion and of a rotational motion about a reference point, it is clear that the information obtained is adequate to describe the motion in the particular plane involved. By using more than two masses or more than one two-axis sensor, it is clear that all the necessary components of the equations of motion can be determined to allow a complete description of the motion of the body.

It will be observed that Coriolis forces are a maximum when the driving forces are a minimum (assuming simple harmonic motion). Thus, residual compOnents of the drive which are registered as spurious Coriolis forces can be distinguished by their phase relationship to a significant extent, and can therefore be removed, to provide even greater precision. If the motion is not simple linear translation, or if significant signal is transferred indirectly (through the housing, for instance), this phase relationship of the spurious signal is liable to be extremely complicated, making the final compensation much more difficult. This indicates once again the importance of dynamic balancing in the system.

It will be appreciated that each piezoelectric device consists of a suitably section of a suitable piezoelectric material, coated on each of two opposite flat faces with thin conductive films from which electrical connections extend. The art of designing and making such piezoelectric devices is well known, and devices are readily obtainable commercially to provide certain desired effects. Thus "compression" piezoelectric devices are available, which when energized by an alternating voltage suffer distortion mainly in the nature of compression along the normal axis between the two flat surfaces. "Shear" piezoelectric devices are available, which when energized by an alternating voltage suffer distortion mainly in the nature of shear along a surface parallel to the two said flat surfaces. Such devices suffer distortion when a suitable electrical voltage is applied between the two said conductive films, and on the other hand they develop an electrical voltage between the two said conductive films when distorted in the appropriate manner by external forces.

The piezoelectric drivers and sensors mentioned above are mounted coaxially with the two proof masses 15 and 17 in the order shown in FIG. 2, and are cemented together by suitable adhesive to form a unitary mass. The unitary mass is located firmly in the housing 9 by being clamped between a plug 35 which closes one end of the housing and a metal abutment 37 inside the other end 36 of the housing. Abutment 37 includes a spigot 37 fitting within an aperture 39 in the said other end of the housing, and this spigot is engaged by a screwed plug 41 screwed into an outer end of the aperture 39. The plug is used to precompress the elements of the unitary mass after it has been inserted into the casing and the plug 35 inserted.

Figure 6:
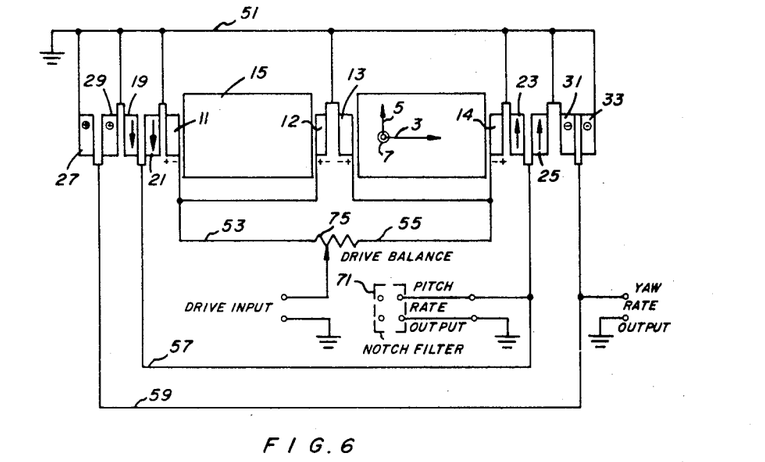
FIG. 6 is an explanatory diagram showing the electrical connections of the sensor of FIGS. 2 through 5.

FIG. 6 shows the electrical connections to the various parts of the angular sensor: the insulated leads 51, 53,55,57 and 59 in that Figure are shown in FIGS. 2 through 5 as being accommodated respectively in longitudinal grooves 61, 63, 65, 67 and 69 in the inside of the housing 9 and being brought out through apertures in the housing end 36, these housing apertures being filled, after installation of the unitary mass, by an initially plastic electrically insulating material. Flexible pigtails are used to connect the terminals on the various piezoelectric devices to the leads 51, 53 and 55.

In use of the device of FIGS. 2 through 6, it can be disposed for example in an aircraft or a missile with its axis 3 parallel to the axis of the aircraft or missile, with its axis 7 parallel to the wings or other equivalent axis of the missile, and with its axis 5 normal to the other two axes. A suitable energizing voltage at a frequency of say 5,000 Hertz is applied to the "drive input " terminals in FIG. 6, and this sets up movement of the two proof masses 15 and 17, the movements of the two masses being along the axis 3 but being 180° out of phase with one another; thus first the two masses 15 and 17 will move apart, and then they will move together. Ideally the external drive forces will cancel out, so that the housing 9 will not vibrate, and by adjustment of a drive balance resistor 75, a close approximation to this condition can be obtained.

In the situation when the flight of the aircraft is a straight line, and no rotation about either the yaw axis 5 or the pitch axis 7 is taking place, then no output will be provided by either the four cumulatively connected pitch rate sensors 19,21,23 and 25 or the four cumulatively connected yaw rate sensors 27, 29, 31 and 33.

In the situation when yaw takes place, an output will be provided by the four yaw rate sensors 27, 29, 31 and 33 and will appear on the yaw rate output terminals. Similar, when pitch occurs an output will appear on the pitch rate output terminals. If both yaw and pitch occur together, outputs will appear on both sets of terminals.

Since the two proof masses 15 and 17 move in opposite directions, the sense of the Coriolis force is different for the two masses and, as indicated by the arrows applied to the various sensors in FIG. 6, this must be taken into account when the sensors to be used are selected, and when they are assembled into the said unitary mass.

It will be noted that the shear sensors are used in pairs with like polarities of each sensor of a pair together: this is done to cancel out spurious signals arising from compression waves in the sensors. Thus if two sensors produce two equal undesired compression signals, by the arrangement shown they counterbalance one another.

Figure 7:
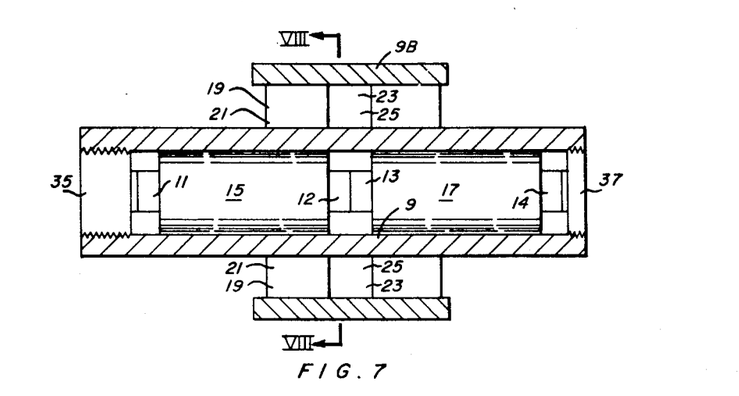
FIG. 7 is a sectional side elevation of a second embodiment of the invention.
Figure 8:
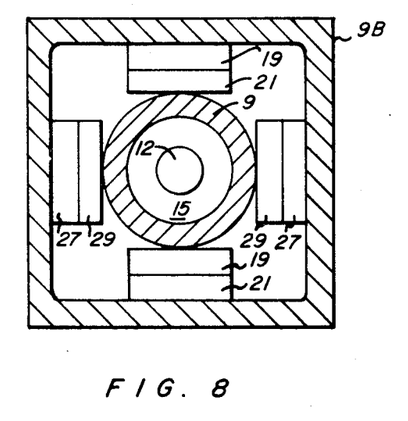
FIG. 8 is a transverse cross section taken on the line VIII—VIII of FIG. 7.

FIGS. 7 and 8 illustrates a modification of the angular velocity sensor of FIGS. 2 through 6, in which modification the shear type piezoelectric sensors are replaced with compression type piezoelectric sensors. As in the earlier embodiment of the invention, two proof masses 15 and 17 are installed in a tubular housing 9 and are provided with piezoelectric driver elements 11, 12, 13 and 14 which are energized by a cyclic voltage to cause vibratory movements of the two proof masses in opposite directions. However, in this case the two proof masses are held in the housing 9 in such a manner that Coriolis force movements of the masses in directions perpendicular to the axis of the tubular housing 9 are transmitted to that housing. The piezoelectric sensors 19, 21, 23 and 25 are in this embodiment compression devices and are fitted tightly between an outer housing 9B and the housing 9.

An advantage of the arrangement of FIGS. 7 and 8 is that, since the distance between the centers of the two proof masses 15 and 17 is greater than the distance between the centers of say piezoelectric sensors 21 and 25, the force set on the sensors is greater than the Coriolis force set up on the proof masses. This may be seen by equating the torques set up on the housing 9 respectively by the proof masses and by the sensors. Of course, the relative movements or displacements vary in an equal and inverse manner, and if alternatively it were desired to provide large displacements with small forces, one could arrange the piezoelectric sensors at a greater spacing along the length of the housing 9 than the center to-center spacing of the two proof masses.

One advantage given by the present invention is the substantial elimination of driving forces on the sensor, which in previous angular velocity sensors using moving masses has introduced an unduly high threshold angular velocity which must be exceeded before a useful output is obtained from the sensor. By the substantial elimination of those forces, a very low threshold angular velocity is obtained.

Figure 9:
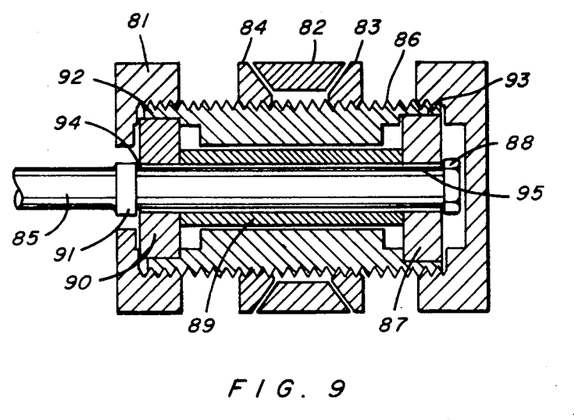
FIG. 9 is a sectional side elevation through a mounted proof mass, provision being made for adjusting the mass center of the proof mass to lie on a drive axis.

In FIG. 9 one possible arrangement is shown for adjusting the mass center of a proof mass to lie on the drive axis. A center shaft 85 has two piezoelectric shear element 87, 90 clamped between a collar 91 and end nut 88 with spacer 89 separating the elements. The outside edges of the shear elements 87 and 90 drive the main body 86 by means of end nuts 80 and 81. Outer electrodes 92 and 93 of elements 87, 90 and inner electrodes 94 and 95 make contact with the main body 86 and the center shaft 85 respectively. When an excitation voltage is applied between the main body and the shaft, the piezoelectric elements 87, 90 will tend to cause motion of the main body relative to the shaft 85 along the axis of the center shaft 85. An eccentric ring 82 is adjustable in rotation between two locking rings 83 and 84 and adjustable in position along the main body 86 by threading. Thus the sub-assembly 82, 83 and 84 form a rider the center of mass of which can be placed at any desired axial position along the center shaft 85 between the end nuts, and at a desired distance out from this axis and at a suitable orientation by choosing the rotational position of the eccentric mass 82. The objective is to place the center of mass of the combination of main body 86, end nuts 80, 81 and rider 82, 83, 84 on the drive axis of the piezoelectric elements. One way of knowing that this has been achieved is to measure the rotational component of the whole assembly when driven: if the drive passes through the center of mass, this component will be zero, otherwise there will be rotational vibration.

Figure 10:
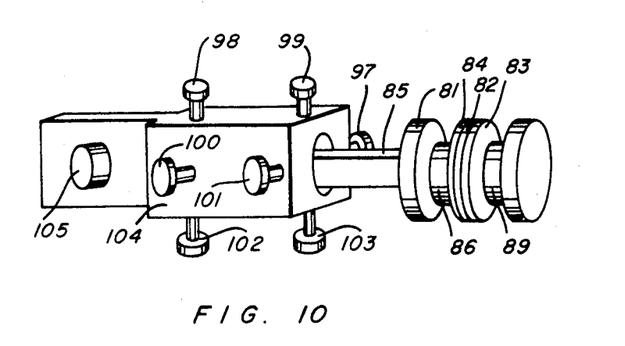
FIG. 10 is a perspective drawing of a proof mass according to FIG. 9 coupled to a sensor.

In FIG. 10 an arrangement is shown for causing the drive axis of the balanced assembly of FIG. 9 to pass through a torque measuring axis. This is desired to prevent the drive force at the mass from introducing a torque at the torque sensor. The assembly of FIG. 9 is shown at the right of FIG. 10 as composed of parts 80, 81, 82, 83, 84, 85 and 86 and 89. The center of mass of this unit has been adjusted, as described above, to lie on the drive axis, which is essentially along the axis of shaft 85 but not quite accurately aligned with it. A squared part of shaft 85 is gripped in a holder 104 which it drives, being engaged by adjusting screws 96 – 103 which are arranged in opposed pairs so that this axis can be adjusted to pass through the center of the torque measuring sensor element 105. When this occurs, no rotational vibration will be sensed by sensor 105 as a consequence of exciting the mass into translational vibration.

Figure 11:
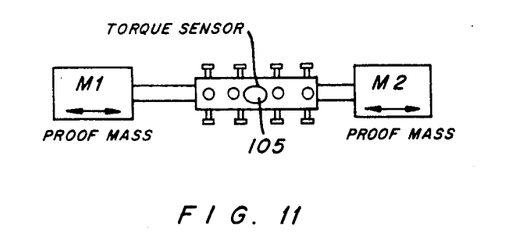
FIG. 11 is a diagrammatic side elevation showing how two proof masses according to FIG. 9 are coupled to a single sensor.

FIG. 11 illustrates how two proof-mass units M1 and M2, according to FIG. 9, are coupled as shown in FIG. 10 to a single sensor 105. This arrangement is directed primarily to measurement of angular velocity.

Although in the embodiments of the invention described above, piezoelectric devices have been described as the driving means, in view of the limited movement produced by such devices, alternatively other devices capable of producing greater amplitudes of motion can be used.

The invention is not limited to the use of two proof masses, and basically two or more proof mass elements can be used, the proof mass elements being capable of relative movement and usually, although not necessarily, being separate bodies.

We claim:
1. An angular rate sensor including:
   a. a housing;
   b. a first proof mass element carried by the said housing;
   c. a second proof mass element carried by the said housing;
   d. driving means for driving the first and second proof mass elements so that each experiences cyclically repetitive rectilinear movement along an axis common to both proof mass elements and the instantaneous movements of the two mass elements relative to the housing being in opposite directions along that axis so as to produce dynamic balance therebetween;
   e. first and second piezoelectric devices acting in the compression mode and acting respectively on opposite ends of the first proof mass element to cause its said repetitive movement;
   f. third and fourth piezoelectric devices acting in the compression mode and acting respectively on opposite ends of the second proof mass element to cause its said repetitive movement; and
   g. further piezoelectric devices arranged to act as sensor means;
   said further piezoelectric devices being connected respectively to opposite ends of an assembly consisting of the said proof masses and said first through fourth piezoelectric devices and said further piezoelectric devices being arranged to act in the shear mode and to provide an electrical output indicative of Coriolis forces acting on the proof mass elements in a direction transverse to their said cyclically repetitive movements.

2. An angular rate sensor according to claim 1, in which means arranged to interpret information from the said sensor means also provides information as to angular rate of the housing.

3. An angular rate sensor according to claim 1, in which means arranged to interpret information from said sensor means also provides information as to linear acceleration of the housing.

4. An angular rate sensor according to claim 1, in which second sensor means are arranged to provide a second output indicative of Coriolis forces on the said mass elements when the sensor housing is subjected to an angular velocity about a second predetermined axis also normal to the said common axis; the arrangement of the sensor means being such that the operation of the driving means in driving the proof mass elements produces substantially no net output from the sensor means in the absence of the production of Coriolis forces on the proof mass elements.

5. An angular rate sensor according to claim 1, and in which:
   a. a first driving means drives the first proof mass element;
   b. a second driving means drives the second proof mass element independently of the first proof mass element;
   c. adjustment means permit adjustment of the driving means to produce a desired dynamic balance between the first and second proof mass elements.

6. An angular rate sensor including:
   a. a housing;
   b. a first proof mass element carried by the said housing;
   c. a second proof mass element carried by the said housing;
   d. driving means for driving the first and second proof mass elements so that each experiences cyclically repetitive rectilinear movement along an axis common to both proof mass elements and the instantaneous movements of the two mass elements relative to the housing being in opposite directions along that axis so as to produce dynamic balance therebetween;
   e. first and second piezoelectric devices acting in the compression mode and acting respectively on opposite ends of the first proof mass element to cause its sand repetitive movement;
   f. third and fourth piezoelectric devices acting in the compression mode and acting respectively on opposite ends of the second proof mass element to cause its said repetive movement; and
   g. further piezoelectric devices arranged to act as sensor means;
said further piezoelectric devices being connected respectively to opposite ends of an assembly consisting of the said proof masses and said first through fourth piezoelectric devices and said further piezoelectric devices being arranged to act in the compression mode and to provide an electrical output indicative of Coriolis forces acting on the proof mass elements in a direction transverse to their said cyclically repetitive movements.

7. An angular rate sensor according to claim 6, in which means arranged to interpret information from the said sensor means also provides information as to angular rate of the housing.

8. An angular rate sensor according to claim 6, in which means arranged to interpret information from said sensor means also provides information as to linear acceleration of the housing.

9. An angular rate sensor according to claim 6, and in which:
   a. a first driving means drives the first proof mass element;
   b. a second driving means drives the second proof mass element independently of the first proof mass element; and
   c. adjustment means permit adjustment of the driving means to produce a desired dynamic balance between the first and second proof mass elements.

10. An angular rate sensor according to claim 6, in which second sensor means are arranged to provide a second output indicative of Coriolis forces on the said mass elements when the sensor housing is subjected to an angular velocity about a second predetermined axis also normal to the said common axis; the arrangement of the sensor means being such that the operation of the driving means in driving the proof mass elements produces substantially no net output from the sensor means in the absence of the production of Coriolis forces on the proof mass elements.

11. An angular rate sensor including:
   a. a housing;
   b. a first proof mass element carried by the said housing;
   c. a second proof mass element carried by the said housing;
   d. driving means for driving the first and second proof mass elements so that each experiences cyclically repetitive rectilinear movement along an axis common to both proof mass elements and the instantaneous movements of the two mass elements relative to the housing being in opposite directions along that axis so as to produce dynamic balance therebetween;
   e. first and second piezoelectric devices acting in the compression mode and acting respectively on opposite ends of the first proof mass element to cause its said repetitive movement;
   f. third and fourth piezoelectric devices acting in the compression mode and acting respectively on opposite ends of the second proof mass element to cause its said repetitive movement;
   g. further piezoelectric devices arranged to act as sensor means; and
   h. a mechanical drive connecting the proof mass elements to the said further piezoelectric devices and providing a mechanical advantage so that the force exerted on the piezoelectric devices is greater than the force exerted on the drive by the proof mass elements;
said further piezoelectric devices thus providing an electrical output indicative of Coriolis forces acting on the proof mass elements in a direction transverse to their cyclically repetitive movements.

12. An angular rate sensor according to claim 11, in which means arranged to interpret information from the said sensor means also provides information as to angular rate of the housing.

13. An angular rate sensor according to claim 11, in which means arranged to interpret information from said sensor means also provides information as to linear acceleration of the housing.

14. An angular rate sensor according to claim 11, and in which:
   a. a first driving means drives the first proof mass element;

b. a second driving means drives the second proof mass element independently of the first proof mass element; and c. adjustment means permit adjustment of the driving means to produce a desired dynamic balance between the first and second proof mass elements.

15. An angular rate sensor according to claim 11, in which second sensor means are arranged to provide a second output indicative of Coriolis forces on the said mass elements when the sensor housing is subjected to an angular velocity about a second predetermined axis also normal to the said common axis; the arrangement of the sensor means being such that the operation of the driving means in driving the proof mass elements produces substantially no net output from the sensor means in the absence of the production of Coriolis forces on the proof mass elements.

* * * * *